(12) United States Patent
Plantan et al.

(10) Patent No.: US 9,132,820 B2
(45) Date of Patent: Sep. 15, 2015

(54) NON-PRESSURE PLATE STONE SHIELD WITH ENERGY ABSORBING LUGS, AND PUSHROD SHIELD FOR WELDED CLEVIS

(75) Inventors: Ronald S. Plantan, Mooresville, NC (US); Brett S. Darner, Wellington, OH (US); Randy J. Salvatora, North Olmsted, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 838 days.

(21) Appl. No.: 13/420,087

(22) Filed: Mar. 14, 2012

(65) Prior Publication Data

US 2013/0239798 A1    Sep. 19, 2013

(51) Int. Cl.
F01B 7/00    (2006.01)
F16J 15/18    (2006.01)
B60T 17/08    (2006.01)
F16D 65/28    (2006.01)

(52) U.S. Cl.
CPC ............. B60T 17/083 (2013.01); B60T 17/088 (2013.01); F16D 65/28 (2013.01)

(58) Field of Classification Search
CPC ... B60T 17/083; B60T 17/085; B60T 17/088; B60T 17/221; F16D 65/0025; F16D 65/28
USPC ................ 92/63, 167, 168; 74/18.2
See application file for complete search history.

(56) References Cited

U.S. PATENT DOCUMENTS

| | | |
|---|---|---|
| 5,320,026 A | 6/1994 | Pierce |
| 5,392,691 A | 2/1995 | Schultz |
| 5,450,930 A | 9/1995 | Martens et al. |
| 6,267,043 B1 | 7/2001 | Plantan et al. |
| 6,314,861 B1 | 11/2001 | Smith et al. |
| 6,318,240 B1 | 11/2001 | Plantan et al. |
| 6,352,137 B1 | 3/2002 | Stegall et al. |
| 6,354,187 B1 | 3/2002 | Plantan et al. |
| 6,360,649 B1 | 3/2002 | Plantan |
| 6,480,107 B2 | 11/2002 | Stonehocker et al. |
| 6,501,375 B1 | 12/2002 | Weant et al. |
| 6,729,224 B1 | 5/2004 | Roy |
| 6,753,771 B2 | 6/2004 | Lesesky |

OTHER PUBLICATIONS

Extended European Search Report dated Sep. 11, 2013 (7 pages).

*Primary Examiner* — Michael Leslie
(74) *Attorney, Agent, or Firm* — Crowell & Moring LLP

(57) ABSTRACT

A fluid pressure operable actuator includes a housing, with an end wall, and a pushrod projecting through an opening in the end wall for reciprocation upon service pressure application or release. A shield, configured as an annulus, is disposed on the pushrod to restrict contamination of an interior chamber of the actuator housing through a gap existing between an edge of the opening and a pushrod outer surface. To facilitate connecting the shield and the pushrod together, the annulus has a slit with an enlarged void at a radially outer end of the slit. This enlarged void engages an outer pushrod surface as the shield and the pushrod are joined.

36 Claims, 9 Drawing Sheets

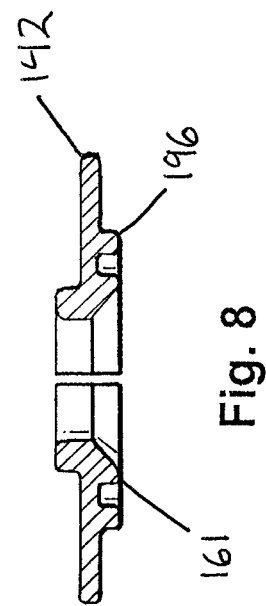
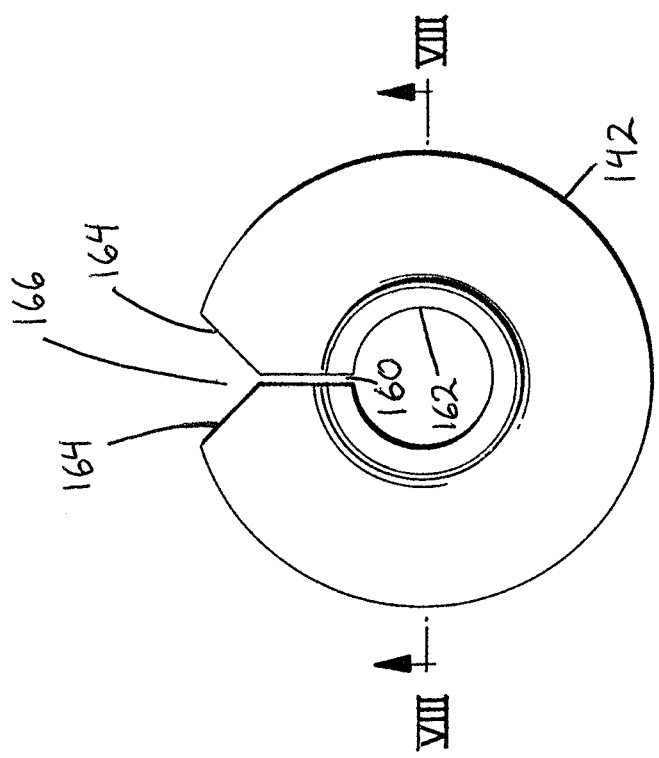
Fig. 8
Fig. 7

NON-PRESSURE PLATE STONE SHIELD WITH ENERGY ABSORBING LUGS, AND PUSHROD SHIELD FOR WELDED CLEVIS

BACKGROUND OF THE INVENTION

1. Field of the Invention

A dust or stone shield of the type forming the subject matter of this invention is designed to surround the pushrod of a fluid operated service brake actuator to operate as a barrier to block entry of contaminants into the actuator housing.

2. Description of Related Art

Dust or stone shields of the type noted are designed to surround pushrods of fluid operated service brake actuators. Typically, this sort of shield operates as a barrier to block entry of contaminants that might otherwise pass from outside an actuator housing, through a gap between a pushrod outer circumference and a pushrod opening in an actuator wall, and into an interior of the actuator housing, such as a chamber providing for expansion and contraction of a service brake pressure volume. In such an arrangement, the shield commonly has an inner diameter surrounding the articulating pushrod at the very location at which side loading of the pushrod occurs. For most rigid shields, shield inner diameters have been accepted as load bearing interfaces. In such a construction, if the inner diameter of a shield is compromised by side loading, the shield may no longer operate effectively.

Conventional pushrod dust or stone shields for chambers with threaded pushrods lack slits or slices in them. When such a shield is to be used with a welded clevis, it is not possible to drop the shield over the end of the pushrod. To address this issue, some shields now used with welded devises have slits or slices to facilitate fitting the shields over respective pushrods. Single-slit designs have been the accepted standard, regardless of assembly difficulty and part stress.

U.S. Pat. No. 6,354,187 to Plantan et al. concerns a known arrangement in which an annular damping stone shield has a slit allowing assembly around a pushrod. An annular groove in the stone shield circumscribes the push rod opening and allows the shield to absorb lateral forces when the push rod is operated during braking.

U.S. Pat. No. 6,729,224 to Roy discloses various configurations of an annular ring surrounding a pushrod when assembled. In one such configuration, the ring has end surfaces that are angled relative to the shaft opening axis of the ring. The angled end surfaces are configured so that the return spring can bias the slit opening in a closed position to create a seal, thereby preventing contaminants from entering the brake chamber.

U.S. Pat. No. 5,320,026 to Pierce, U.S. Pat. No. 5,392,691 to Schultz, U.S. Pat. No. 5,450,930 to Martens et al., U.S. Pat. No. 6,267,043 to Plantan et al., U.S. Pat. No. 6,314,861 to Smith et al., U.S. Pat. No. 6,318,240 to Plantan et al., U.S. Pat. No. 6,360,649 to Plantan, U.S. Pat. No. 6,480,107 to Stonehocker et al., U.S. Pat. No. 6,501,375 to Weant et al., and U.S. Pat. No. 6,753,771 to Lesesky are also of interest.

SUMMARY OF THE INVENTION

A fluid pressure operable actuator according to the invention includes an actuator housing having an end wall, and a pushrod projecting through an opening in the end wall for reciprocation upon service pressure application or release. A shield, configured as an annulus, is disposed on the pushrod to restrict contamination of an interior chamber of the actuator housing through a gap existing between an edge of the opening and a pushrod outer surface. To facilitate connecting the shield and the pushrod together, the annulus has a slit with an enlarged void at a radially outer end of the slit that engages an outer pushrod surface as the shield and the pushrod are joined. In each of the particularly disclosed embodiments, the enlarged void is defined by angled surfaces diverging from one end of the slit at approximately a right angle.

The shield is constrained against movement relative to the end wall. Constraint of the shield in this way is provided by either a cover secured to the end wall or a spring that biases the shield against the end wall. In the latter case, the shield may actually define a seat for one end of the spring.

In one arrangement, the shield includes a plurality of lugs that receive, absorb, and dissipate lateral pushrod loading. Preferably, at least some of the lugs include voids defined near tips of the lugs. The energy-absorbing lugs, integral with the shield, provide advantageous load mitigation. More precisely, in normal air operated service brake application, the pushrod moves in a linear direction to apply or release the brake. As a secondary consequence of actuation, however, the pushrod also moves laterally. This lateral movement can be detrimental to both the housing and the shield used to protect the housing interior. The pushrod can degrade the structural integrity of the housing, the shield, or both the housing and the shield when contact occurs, and can itself be damaged as well by excessive side loading. Side loading imposed by the pushrod, here, is removed from the inner diameter of the shield, and, instead, is absorbed, dissipated, or partly absorbed and partly dissipated by the lugs, which form part of the shield circumferential exterior.

The shield may include a surface that positions the shield within the opening in the end wall; such a surface can be either the surface of a single central flange surrounding a central opening in the shield or a surface of an outer flange disposed concentrically with an inner flange surrounding the central shield opening.

In another disclosed arrangement, only the radial slit and void arrangement mentioned is included, and the special energy absorbing features helping the shield receive, absorb, or dissipate side-to-side pushrod loading are not provided. This arrangement still facilitates assembly, and is usable across product lines to commonize parts and improve end user product quality. Both arrangements are highly visible to end users, producing directly recognizable improvements that should enhance customer satisfaction.

BRIEF DESCRIPTION OF THE DRAWINGS

FIG. 7 is a plan view of the shield of the second embodiment.

FIG. 8 is a view of the shield of FIG. 7 along line VIII-VIII.

DETAILED DESCRIPTION OF THE INVENTION

The first embodiment described is a dust or stone shield for an unpressurized brake actuator chamber. In this embodiment, a pushrod, with a yoke that connects to a slack adjuster or another brake assembly element, extends through an opening in an actuator housing end wall, and a new and improved shield assembly, having a floating deformable shield with a plurality of energy absorbing lugs, is retained in an oversized cover within the unpressurized brake actuator chamber. Lugs on the shield have curved voids near their tips to improve the ability of the shield to absorb energy when the pushrod moves in a radial direction during operation.

The shield is formed as an annulus, and has a radial slit extending from its outer diameter to a central inner opening encompassing the pushrod after the shield is installed. Angular surfaces extend from the outer end of the slit and intersect the perimeter of the shield to create an angular void in the shield at the slit outer terminus. When pressed radially against the pushrod during assembly, the angular void allows the shield to be circumferentially deformed as the pushrod travels along the slit toward the inner opening of the shield. The floating shield is retained within a cover that allows at least radial movement (floating), inside of the cover, within the actuator housing. An advantageous combination of the shaped energy absorbing lugs and the angular voids eases assembly of the shield onto the pushrod and permits the floating mentioned.

Figure 1:
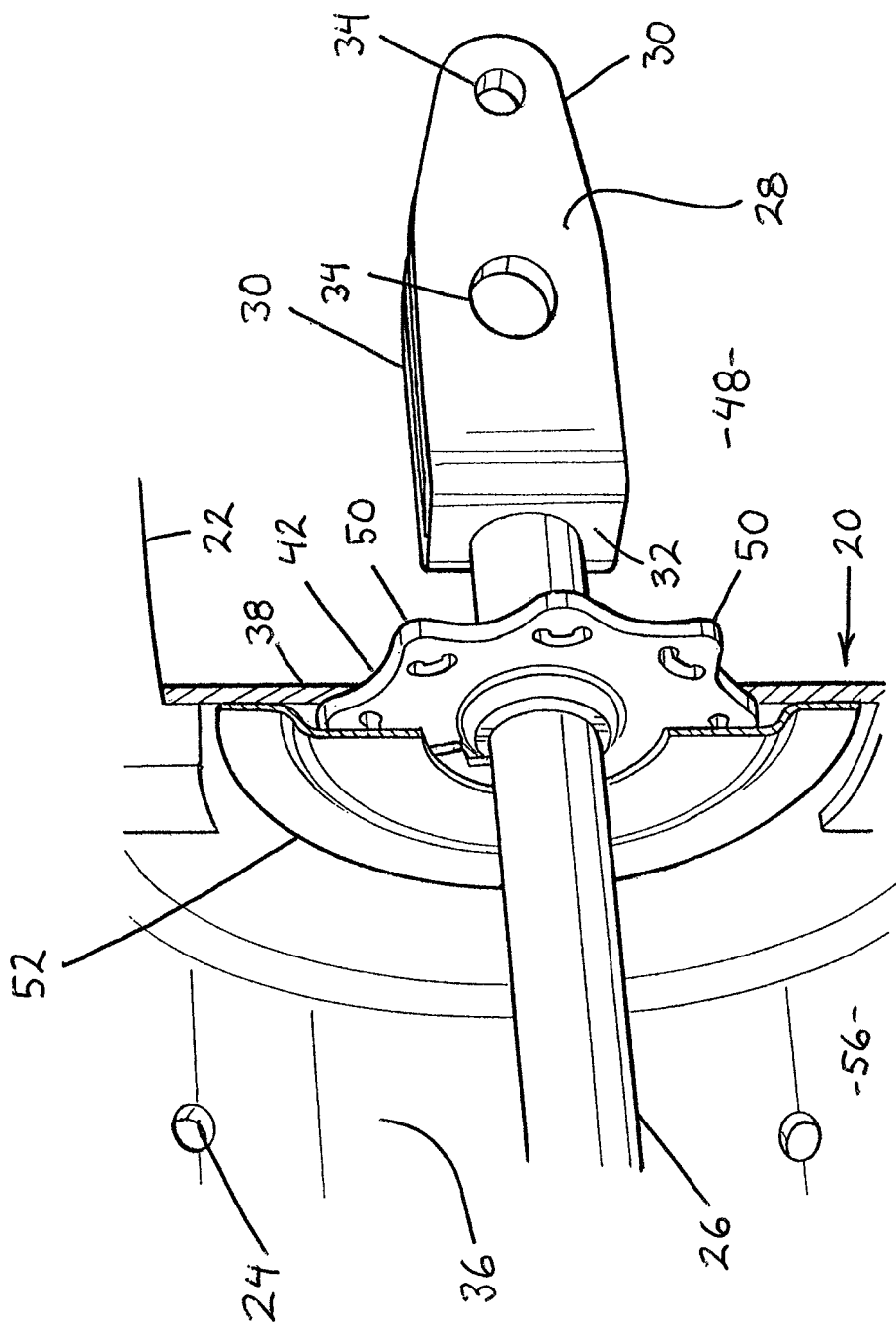
FIG. 1 is a partially cut away view of the interior of a brake actuator housing, with a reciprocating pushrod, using a shield to restrict housing contamination according to a first embodiment of the invention.

Part of the first embodiment of the invention may be seen in the partially cut away view of FIG. 1. FIG. 1 shows the interior of a non-pressure brake actuator housing 20 secured, via mounting bolts or other such fasteners 22, to a vehicle utilizing an air brake system having the housing 20. The brake actuator housing 20 forms part of an overall brake actuating unit generally configured have a construction similar to that forming the subject matter of either U.S. Pat. No. 6,729,224 to Roy or U.S. Pat. No. 6,354,187 to Plantan et al. mentioned above. The disclosures of both the Roy ('224) patent and the Plantan et al. ('187) patent referred to are incorporated herein by reference in their entireties as non-essential subject matter.

Ventilation openings 24 provide for communication between the interior of the actuator housing 20 and the atmosphere 48 at the exterior of the housing 20. The actuator includes a pushrod 26 with a yoke, a clevis, or some other connection 28 (referred to hereafter as "yoke" for simplicity) secured to its end. Air or, possibly, hydraulic fluid could be used to displace the pushrod during operation. As illustrated, the yoke 28 has a generally U-shaped configuration, including legs 30 joined together by way of a central connecting section 32. Openings 34 in the legs 30 are used to connect the yoke 28 to the slack adjuster of a drum or disc brake assembly or to some other brake operating element.

Figure 2:
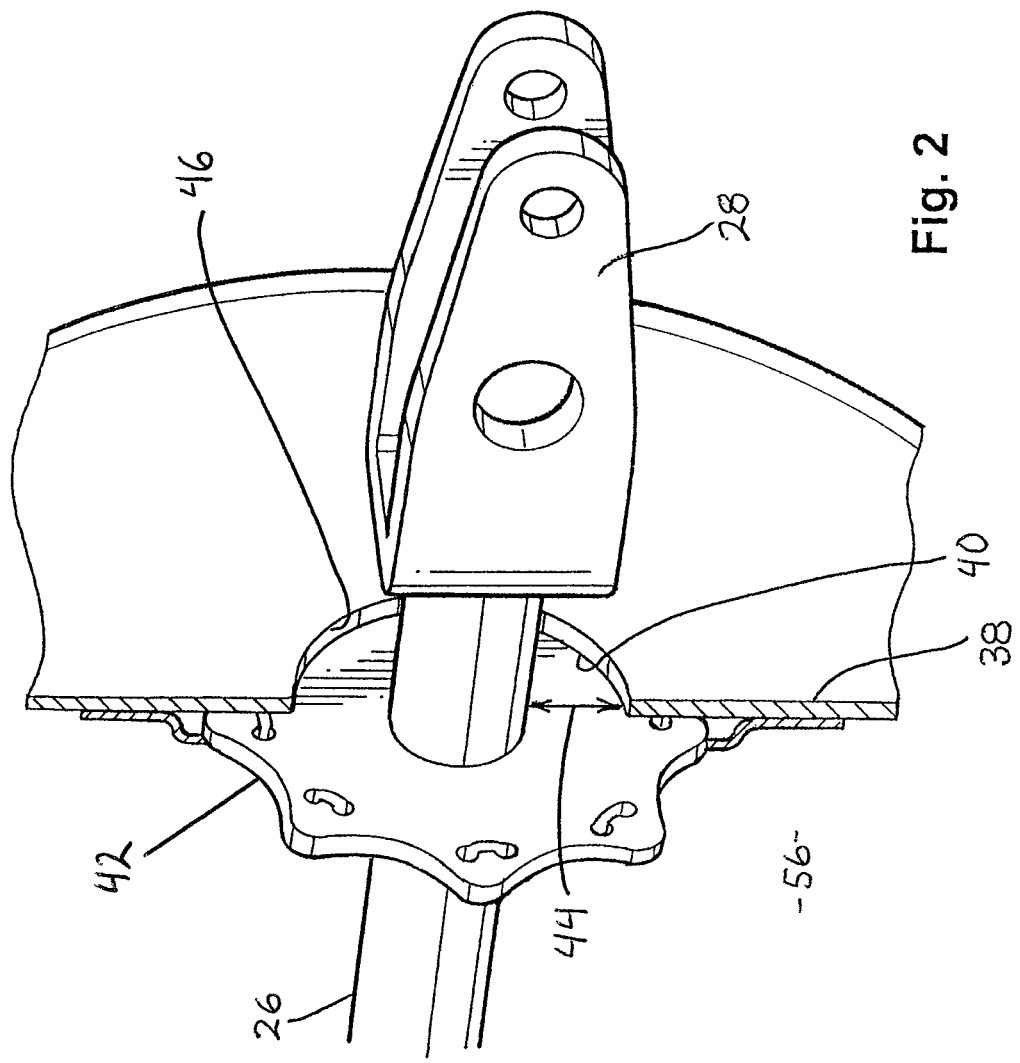
FIG. 2 is a partially cut away view from outside of an end wall of the housing shown in FIG. 1.
Figure 3:
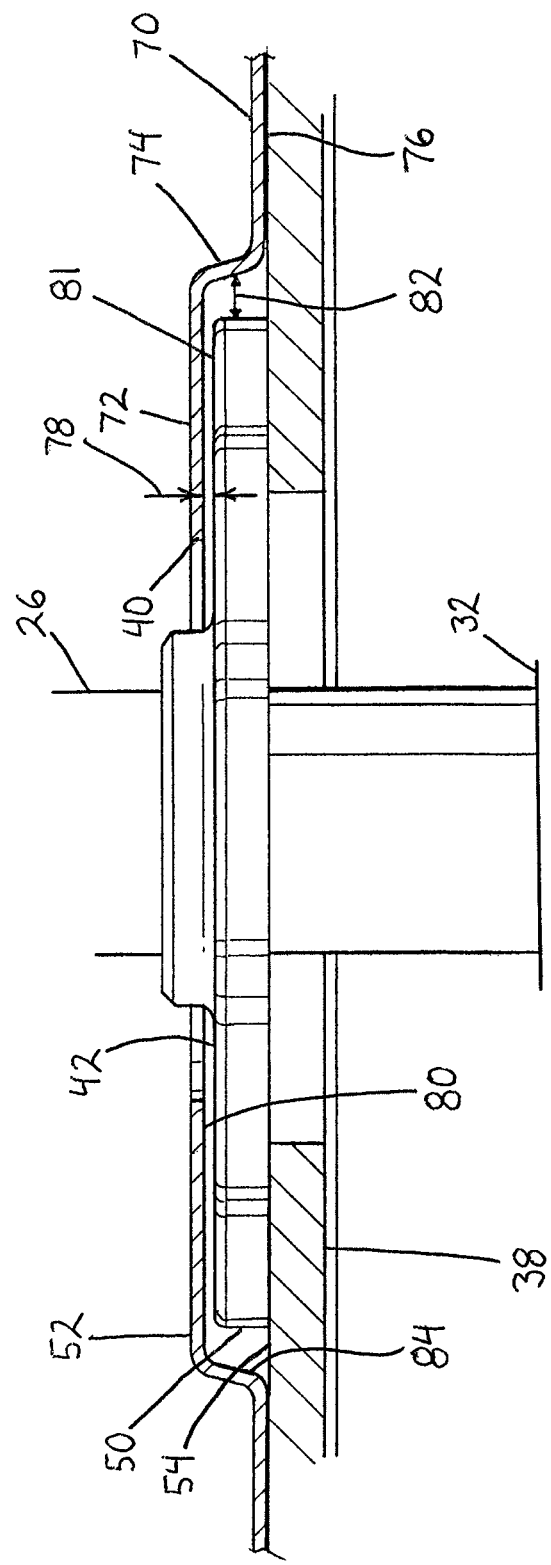
FIG. 3 is a side, part sectional view of a shield assembly formed by the shield itself and a cover for the shield.

The actuator housing 20 shown includes a circumferential wall 36, having the ventilation openings 24, and an end wall 38. The pushrod 26 projects through an approximately central opening 40 in the end wall 38, as best shown in FIG. 2, for axial reciprocation produced by supply of pressurized air or other fluid to and exhaust of pressurized air or other fluid from a service brake pressure volume (not shown). A shield 42 operates as a barrier, preventing entry of contaminants that, otherwise, might pass from the exterior of the housing 20, through a gap 44 between a pushrod outer surface and the edge 46 of the central pushrod opening in the end wall 38, and into an interior chamber 56, vented by the openings 24 to the atmosphere 48, providing for expansion and contraction of the service brake pressure volume. The shield 42 is a floating, deformable element provided with a plurality of energy absorbing lugs 50, and is retained in an oversized cover 52, held by a spring (not shown) against a surface 54. The cover 52 may also be welded or otherwise secured to the surface 54, which, as shown in FIG. 3, is a surface of the end wall 38 delimiting the non-pressurized interior chamber 56. In this embodiment, the shield 42 is to be assembled on the pushrod 26 before the cover 52 is secured to the end wall surface 54. Together, the shield 42 and the cover 52 constitute an overall shield assembly.

Figure 4:
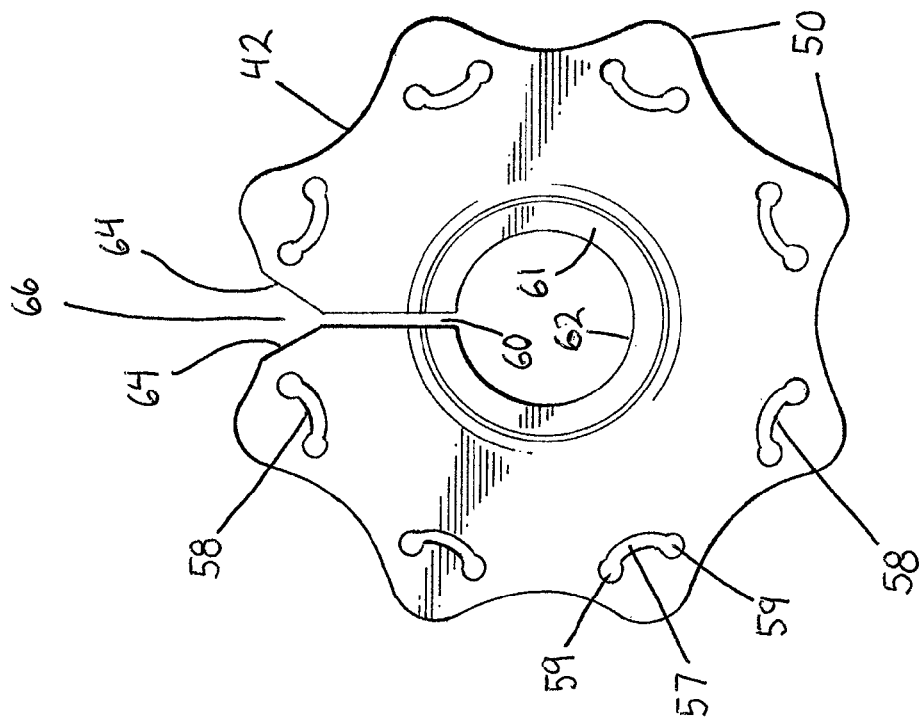
FIG. 4 is a plan view of the shield according to the first embodiment of the invention.

The shield 42 according to the first embodiment of the invention is best shown in FIG. 4, which illustrates each of the energy absorbing lugs 50 of the shield 42 as having a curved void 58 near its tip. Fewer than all of the lugs 50, of course, could be associated with respective voids. Each of the voids 58 shown includes an arcuate, inwardly bowed central section 57 interconnecting a pair of enlarged terminal ends 59. The voids 58 improve the ability of the shield 42 to absorb energy when the pushrod 26 happens to be displaced in a radial direction during operation. The voids 58 are sized and positioned so that a maximum displacement of the shield, limited by way of clearances 78 and 82 to be described, will not permit contamination of the interior chamber 56 through the voids 58.

The shield 42 also has a radial slit 60 extending from its outer circumference to a central inner pushrod-receiving opening 62 that encompasses the pushrod 26 when the shield is installed. At the radially outer end of the slit 60, angular surfaces 64 extend from the slit and form part of the shield perimeter, creating an angular void 66 in the shield at the radially outer end of the slit 60. Each of the surfaces 64 is oriented at an acute angle relative to a central line bisecting the void 66, such that the surfaces 64 are oriented at roughly 65°-115° relative to each other. Angles outside of the range noted are also acceptable. One preferred design has the surfaces 64 oriented at an acute angle of about 80°, while another preferred design has the surfaces 64 oriented at an angle of about 70°.

The slit 60 and the void 66 combine to define a roughly "Y-" shaped opening or cutout in the shield 42. When the angular surfaces 64 of the void 66 press radially against the pushrod exterior during assembly, these surfaces 64 cause the shield to be circumferentially deformed as the shield 42 is twisted and the pushrod 26 is displaced along the slit 60 towards the central inner opening 62. A combination of the slit 60 and the void 66 engages the pushrod outer surface more broadly than a slit alone, without such a void or cutout, so that a shield having the Y-shaped cutout mentioned requires less effort to assemble, due to the broad opening, than a shield lacking the void or cutout. A slit having such a cutout also does not require the same degree of slit expansion, thereby protecting the strength and integrity of the shield itself. The shield 42 preferably has an enlarged thickness around the opening 62 to form a flange 61 enhancing stiffness and structural integrity of the shield.

Figure 11:
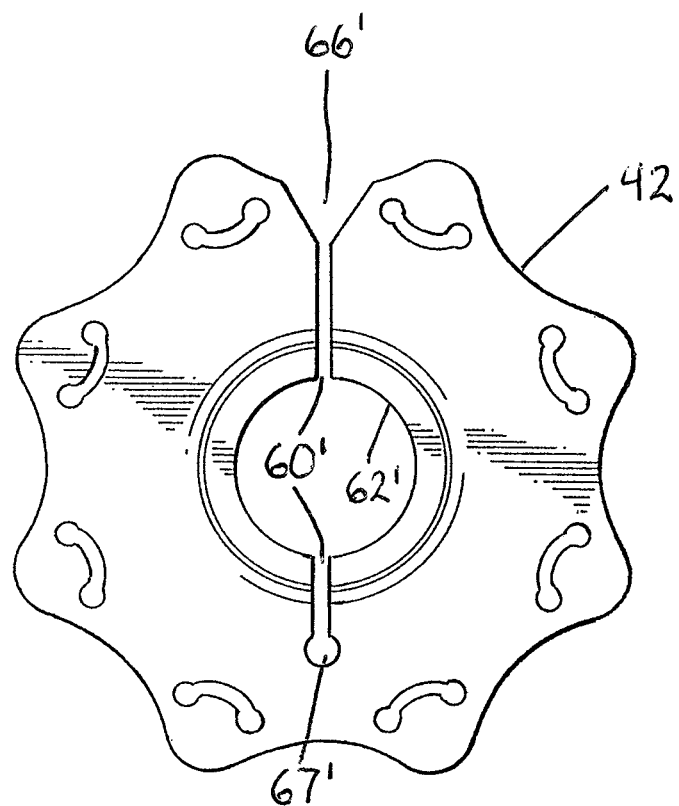
FIG. 11 is a view similar to that of FIG. 4 but of an alternative shield configuration.

In another configuration, shown in FIG. 11, a radial slit 60' extends from the enlarged angular void 66' at the outer circumference of the shield 42' beyond the central inner pushrod-receiving opening 62'. An end 67' of the slit 60' distal the angular void 66' is defined by an opening having a thickness slightly larger than that of the slit 60' itself. In all other aspects, the shield 42' shown in FIG. 11 is the same as the shield 42 shown in FIG. 4.

Figure 5:
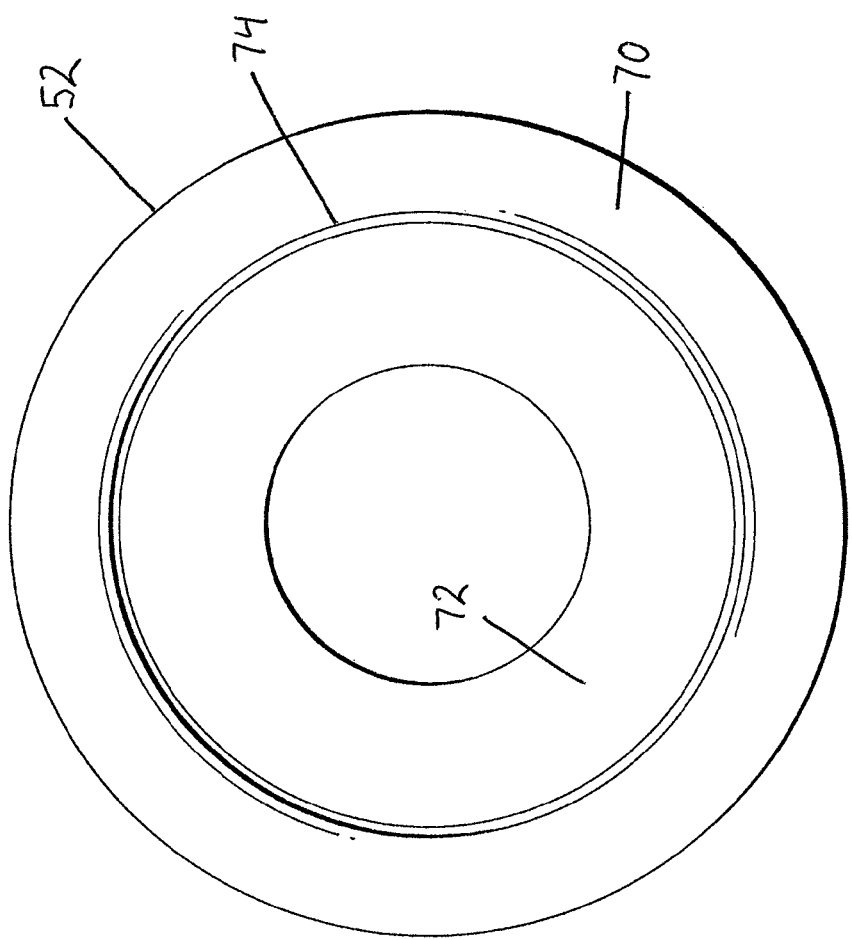
FIG. 5 is a plan view of the cover, which is used to secure the shield to the housing end wall.

The oversized cover 52, visible in FIG. 5, may include three concentric flanges. These three flanges include a circumferentially outer, radially extending, annular mounting flange 70, a circumferentially inner, radially extending, annular retention flange 72, and an axially extending, annular connection flange 74, which joins together the mounting and retention flanges 70 and 72. FIG. 3 shows the shield 42 and the cover 52, collectively constituting the overall shield assembly, in a mounted condition on the housing end wall 38. In this mounted condition, an annular underside 76 of the mounting flange 70 is welded or otherwise retained on the surface 54 of the end wall 38, a small axial clearance 78 is defined between an annular underside 80 of the retention flange 72 and a side surface 81 of the shield 42, and circumferential clearances 82 are defined between an annular underside 84 of the connection flange 74 and the tips of the energy absorbing lugs 50.

By way of the two-piece shield assembly illustrated in FIGS. 1-3, a floating, deformable shield 42, with a plurality of energy absorbing lugs 50, is retained within the non-pressurized chamber 56, in an advantageous manner, between the cover 52 and the surface 54 of the end wall 38. The shield 42 is retained within the cover 52 in a way that allows radial movement (floating) inside of the cover through the clearances 82 and, to a lesser extent, axial movement (floating) inside of the cover through the clearance 78. The angular void 66 at the radially outer end of the slit 60 and the energy absorbing lugs 50 provide for both easy assembly of the shield 42 onto the pushrod 26 and ready deformation of the shield 42 to the limited extent necessary during use.

The shield assembly described thus prevents contamination of the chamber 56 by debris that could otherwise pass from the exterior of the housing 20 through the gap 44 and, simultaneously, accommodates articulation of the pushrod 26. The energy absorbing lugs 50 of the shield 42 receive, absorb, and help to dissipate side-to-side loading on the pushrod 26, thereby improving shielding integrity. By relieving the inner shield opening 62 of forces imposed by pushrod side-to-side loading, the shield 42 retains integrity at its inner diameter, keeping the shielding function intact. The energy absorbing lugs, of course, will collapse on themselves if loading on the pushrod increases articulation to a greater degree.

A shield according to the first embodiment of the invention thus has the dual effect of providing the chamber 56 with internal shielding and accommodating side-to-side loading imposed by articulation of the pushrod 26. The energy absorbing feature provided by the illustrated voids 58, of course, could be accomplished by other void geometries. Additional integral parts produced by over-molding further features to absorb side loading could also be used, although an over-molding process would be more expensive and not necessarily as robust. Although the shield 42 is preferably a molded nylon part to be assembled onto an existing pushrod assembly, medium to high durometer rubber or another appropriate material could alternatively be used.

While the first embodiment of the invention is described in connection with certain overall brake actuating unit configurations, energy absorbing features such as those disclosed could be incorporated into any product in which energy diversion is desirable.

Figure 6:
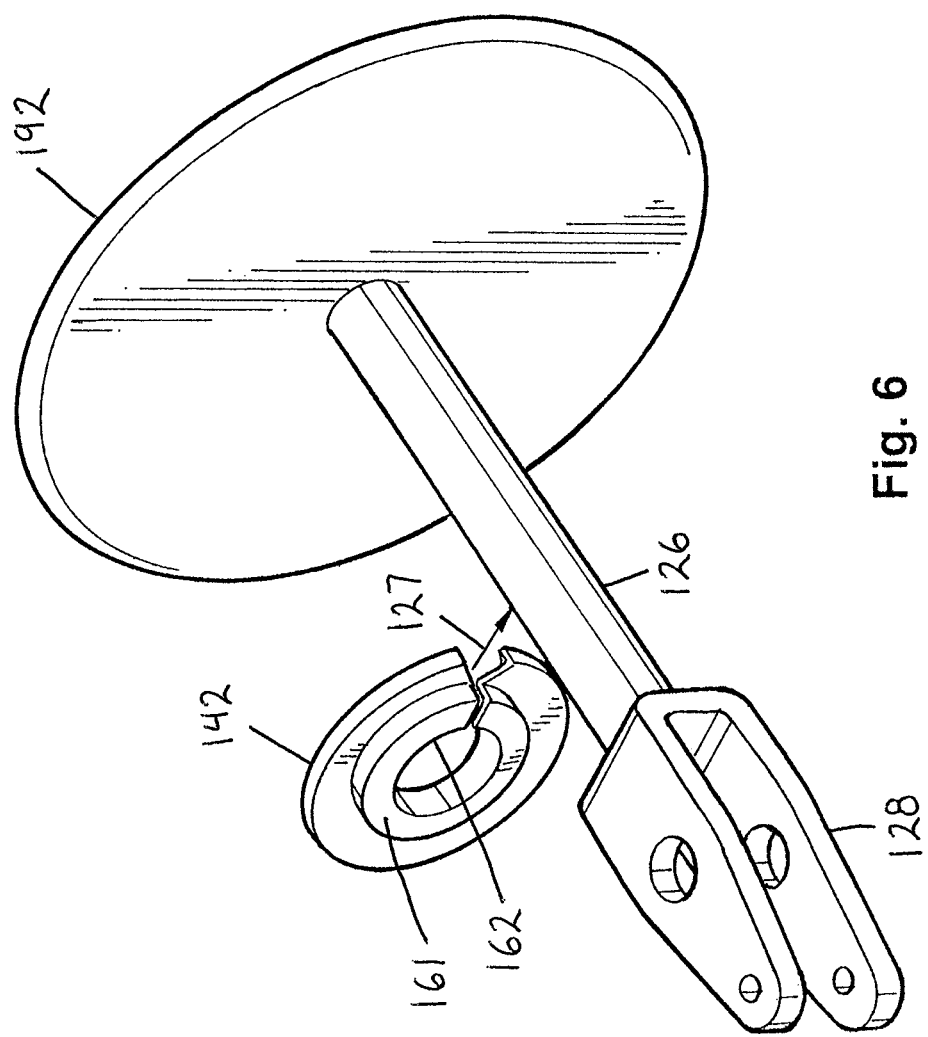
FIG. 6 illustrates a reciprocating pushrod and one of several variations of a second shield embodiment without special energy absorbing features.

FIGS. 6-10 illustrate several variations of a second embodiment of the invention, which has a radial slit and void arrangement similar to that described above but which does not include any special energy absorbing lugs, curved voids, or other features helping the shield receive, absorb, or dissipate side-to-side pushrod loading. Elements of the second embodiment that are essentially the same as or analogous to those described in connection with the first embodiment are identified by the same reference numbers increased by one hundred. Thus, FIG. 6 illustrates a brake actuator pushrod 126, with a yoke 128 secured to its end. A shield 142, preferably having an enlarged thickness forming a flange 161 around its central inner opening 162, is also shown in FIG. 6. In addition to enhancing stiffness and structural integrity, the flange 161 can perform a positioning function to be described.

FIG. 7, which is a plan view of the shield 142 of the second embodiment, shows that the shield 142 also has a radial slit 160 extending from its outer circumference to a central inner opening 162, which is to encompass the pushrod 126 when the shield is installed. At the radially outer end of the slit 160, angular surfaces 164 extend from the slit and form part of the shield perimeter, creating an angular void 166 in the shield at the radially outer end of the slit 160. As in the first embodiment, each surface 164 in the second embodiment is oriented at an acute angle relative to a central line bisecting the void 166, such that the surfaces 164 are oriented at roughly 65°-115° relative to each other. Once again, this range is not to be considered limiting, and angles outside of the range noted are also acceptable. Once again, moreover, the slit 160 and the void 166 combine to define a roughly "Y-" shaped opening, so that when the angular surfaces 164 of the void 166 press radially against the pushrod exterior during assembly, the surfaces 164 cause the shield to be circumferentially deformed as the shield 142 is twisted and the pushrod 126 is displaced along the slit 160 towards the central inner opening 162. Displacement of the pushrod 126 in this way will occur upon movement of the shield 142 relative to the pushrod 126 in the direction of arrow 127 in FIG. 6.

Figure 9:
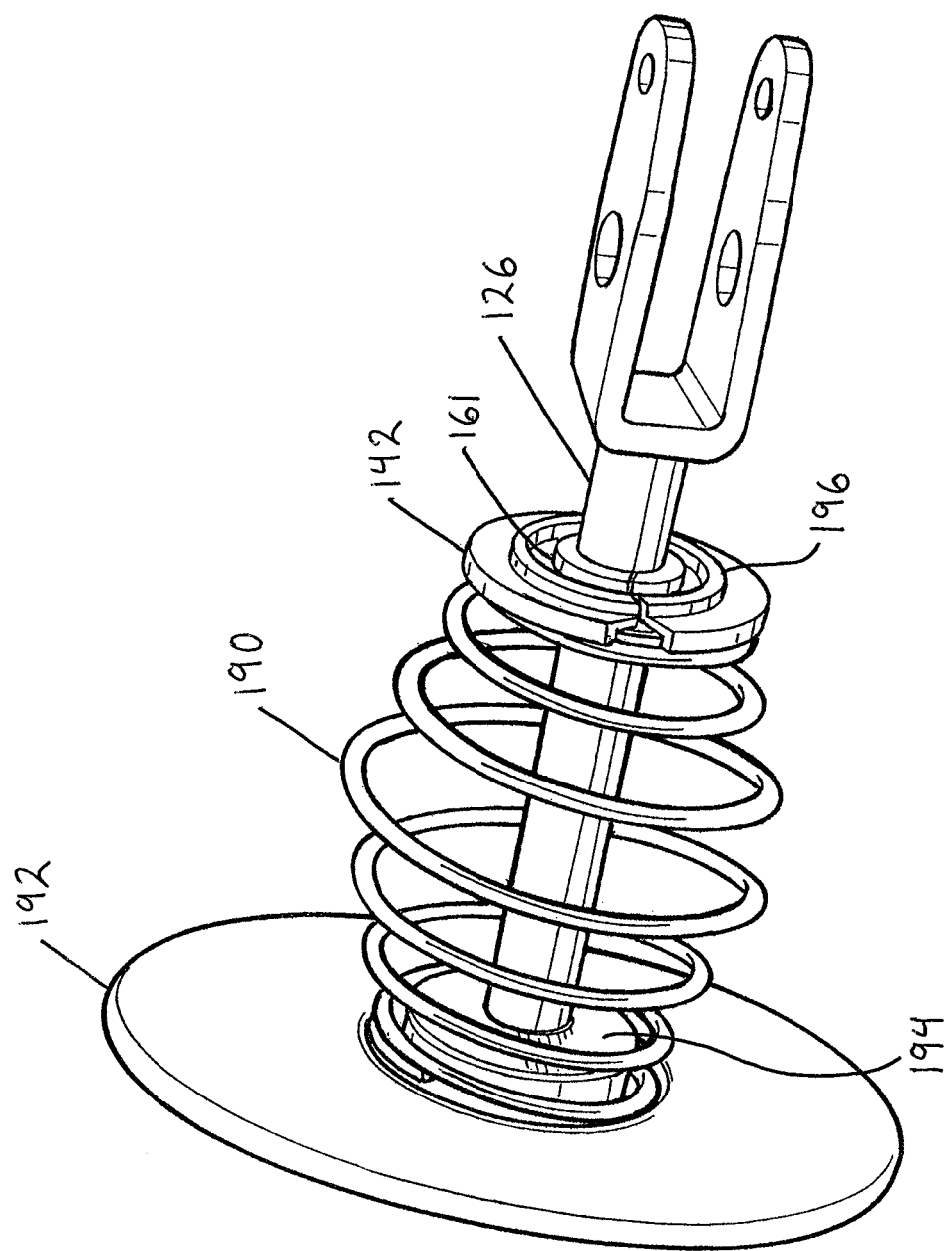
FIG. 9 illustrates the shield of the second embodiment in use as a seat for one end of a service brake piston return spring.

While the first embodiment utilizes a cover 52 to retain the shield 42 in position, the second embodiment does not require such a cover. Instead, in the second embodiment, the shield 142 is permitted to move axially along the outer surface of the pushrod 126. When in use, as shown in FIG. 9, the shield 142 of the second embodiment serves as a spring seat for one end of a service brake piston return spring 190. The return spring 190, at its second, opposite end, is secured to a service brake piston head 192 (FIGS. 6, 9, and 10) by way of an anchor 194.

Figure 10:
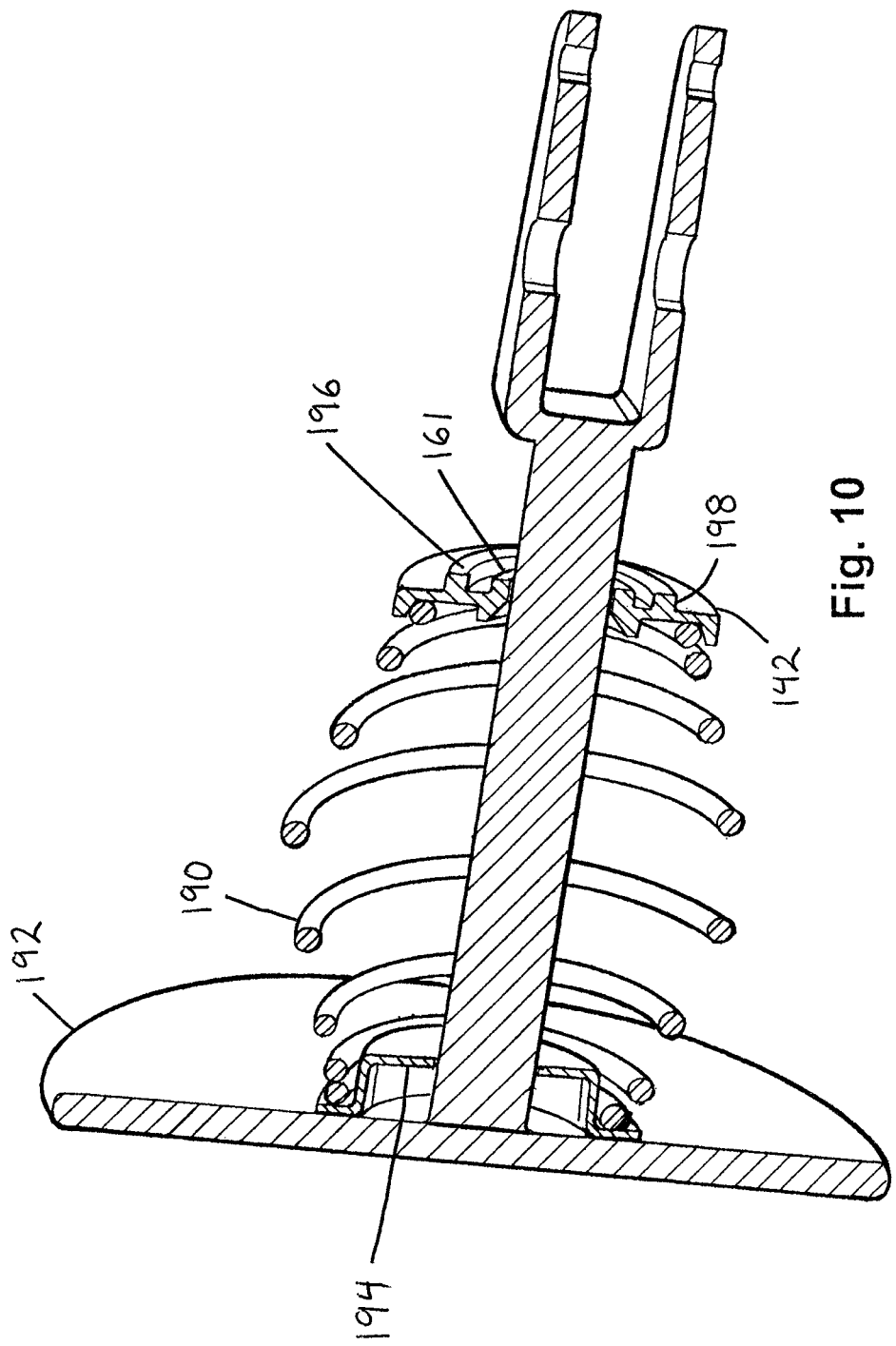
FIG. 10 is an enlarged sectional view of the arrangement shown in FIG. 9.

Although it is not shown in FIGS. 6, 9, and 10 for reasons of clarity, a non-pressure actuator housing similar to the housing 20 of the first embodiment receives the service brake piston head 192 for movement within the housing. A configuration including the piston head 192 and the return spring 190 could also be used in connection with the arrangement illustrated in FIGS. 1 and 2. The pushrod 126 of the second embodiment projects for axial reciprocation through an approximately central opening in an actuator housing end wall in the same way that the pushrod 26 of the first embodiment projects through the end wall 38. In use, the return spring 190 operates to bias the shield 142 into contact with the brake actuator housing end wall. A centering flange 196, shown in FIGS. 8, 9, and 10 as formed on the shield 142 concentrically with the stiffness enhancing flange 161, is designed for reception in the end wall opening through which the pushrod 126 projects so that a surface 198 of the flange 196 assures correct shield positioning. If desired, a single, somewhat thicker stiffness enhancing flange 161, such as that shown in FIG. 6, may perform both the shield stiffness enhancing function and the shield positioning function.

A pushrod stone or dust shield according to the invention, again, will be made of nylon or equivalent material, and will be split for ease in installation. The split, in each embodiment described, will include an approximately 90° degree lead-in feature to help open the shield for sliding over the push rod. The shield does not actually seal the actuator in an airtight manner, and allows lateral pushrod motion. The shield of the second embodiment of the cover of the first embodiment also assists in keeping the return spring centered with respect to the pushrod.

Advantages of all arrangements according to the invention include ease in assembly, lower part weight, and improved reliability. In each arrangement, the lead-in feature of the shield slice assists an installer when deforming the shield to fit around the pushrod.

The Y-shaped void or cutout described enables the shield to engage the pushrod with a broad opening for assembly, and enables the shield to slide onto the pushrod with less expansion of the slit. While a Y-shaped cutout is described and illustrated, the cutout could have a U-shaped profile, a part-spherical profile, a square profile, or any other profile that would also provide improved assembly by expanding the radial terminus of a slit in the shield. As mentioned, medium to high durometer rubber could be used as the shield material, although care would have to be taken to ensure part integrity across the required temperature range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fluid pressure operable actuator, comprising:
    an actuator housing having an end wall;
    a pushrod projecting through an opening in the end wall for reciprocation upon service pressure application or release, an edge of the opening and a pushrod outer surface together defining a gap; and
    a shield disposed on the pushrod to restrict contamination of an interior chamber of the actuator housing through the gap;
    wherein the shield is an annulus with a slit having an enlarged void at a radially outer end of the slit to facilitate connecting the shield and the pushrod together;
    wherein the shield includes a plurality of lugs that receive, absorb, and dissipate lateral pushrod loading; and
    wherein at least some of the lugs include voids defined near tips thereof.

2. The actuator of claim 1, wherein the shield is constrained against movement relative to the end wall.

3. The actuator of claim 2, wherein the shield is secured to the end wall by a cover.

4. The actuator of claim 3, wherein the cover is located within the interior chamber.

5. The actuator of claim 2, wherein the shield is biased by a spring against the end wall.

6. The actuator of claim 5, wherein the shield defines a seat for one end of the spring.

7. The actuator of claim 1, wherein the enlarged void is defined by angled surfaces diverging from one end of the slit.

8. The actuator of claim 7, wherein the angled surfaces diverge at an angle of approximately 65°-115°.

9. The actuator of claim 5, wherein the shield includes a surface that positions the shield within the opening in the end wall.

10. The actuator of claim 9, wherein the surface is a surface of a single central flange surrounding a central opening in the shield.

11. The actuator of claim 9, wherein the surface is a surface of an outer flange disposed concentrically with an inner flange surrounding a central opening in the shield.

12. The actuator of claim 1, wherein the slit extends from the enlarged void beyond a central inner pushrod-receiving opening in the shield.

13. A process of assembling together a pushrod that is to pass through an opening in an end wall of an actuator housing and a shield that is to restrict contamination of an interior chamber of the actuator housing through a gap between an edge of the opening and a pushrod outer surface, comprising:
    disposing the pushrod and the shield, which is formed as an annulus with a slit and an enlarged void at a radially outer end of the slit, adjacent to each other; and
    joining the shield and the pushrod together by contacting surfaces of the enlarged void with the pushrod outer surface, twisting the shield, and displacing the shield and the pushrod laterally relative to each other until the pushrod resides in a central inner opening of the annulus.

14. The process of claim 13, further comprising placing a cover over the shield so that the cover is adjacent to the end wall after joining the shield and the pushrod together.

15. The process of claim 14, wherein the shield includes a plurality of lugs for receiving, absorbing, and dissipating lateral pushrod loading.

16. The process of claim 15, wherein at least some of the lugs include voids defined near tips thereof.

17. The process of claim 13, wherein the shield is biased by a spring against the end wall.

18. The process of claim 16, wherein the voids near the tips of the lugs are sized and positioned so that a maximum displacement of the shield between the cover and the end wall will not permit contamination of the interior chamber by way of the voids near the tips of the lugs.

19. A fluid pressure operable actuator, comprising:
    an actuator housing having an end wall;
    a pushrod projecting through an opening in the end wall for reciprocation upon service pressure application or release, an edge of the opening and a pushrod outer surface together defining a gap; and
    a shield disposed on the pushrod to restrict contamination of an interior chamber of the actuator housing through the gap;
    wherein the shield includes a plurality of lugs that receive, absorb, and dissipate lateral pushrod loading; and
    wherein at least some of the lugs include voids defined near tips thereof.

20. The actuator of claim 19, wherein the shield is constrained against movement relative to the end wall.

21. The actuator of claim 20, wherein the shield is secured to the end wall by a cover.

22. The actuator of claim 21, wherein the cover is located within the interior chamber.

23. The actuator of claim 20, wherein the shield is biased by a spring against the end wall.

24. The actuator of claim 23, wherein the shield defines a seat for one end of the spring.

25. The actuator of claim 23, wherein the shield includes a surface that positions the shield within the opening in the end wall.

26. The actuator of claim 19, wherein the shield includes a surface that positions the shield within the opening in the end wall.

27. The actuator of claim 26, wherein the surface is a surface of a single central flange surrounding a central opening in the shield.

28. The actuator of claim 26, wherein the surface is a surface of an outer flange disposed concentrically with an inner flange surrounding a central opening in the shield.

29. A shield mountable on a pushrod projecting through an opening in an end wall of a fluid pressure operable actuator for reciprocation upon service pressure application or release so as to overlie a gap defined between an edge of the opening and a pushrod outer surface and restrict contamination of an interior chamber of the actuator housing through the gap, the shield comprising:
- a deformable element defining an annulus having a central opening; and
- a plurality of circumferentially distributed, radially projecting lugs that receive, absorb, and dissipate lateral loading imposed on the deformable element;
- wherein at least some of the lugs include voids defined near tips thereof.

30. The shield of claim 29, wherein the annulus has a slit with an enlarged void at a radially outer end of the slit.

31. The shield of claim 29, including a seat for one end of a spring.

32. The shield of claim 30, wherein the enlarged void is defined by angled surfaces diverging from one end of the slit.

33. The shield of claim 32, wherein the angled surfaces diverge at an angle of approximately 65°-115°.

34. The shield of claim 29, wherein a single central flange surrounds the central opening.

35. The shield of claim 29, wherein an outer flange is disposed concentrically with an inner flange that surrounds the central opening.

36. The shield of claim 30, wherein the slit extends from the enlarged void beyond the central opening in the shield.

* * * * *